US012027741B2

(12) United States Patent
Zou et al.

(10) Patent No.: US 12,027,741 B2
(45) Date of Patent: Jul. 2, 2024

(54) DIELECTRIC FILTER AND COMMUNICATION DEVICE

(71) Applicant: HUAWEI TECHNOLOGIES CO., LTD., Guangdong (CN)

(72) Inventors: Meng Zou, Shanghai (CN); Jing Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 17/895,670

(22) Filed: Aug. 25, 2022

(65) Prior Publication Data

US 2022/0416384 A1 Dec. 29, 2022

Related U.S. Application Data

(63) Continuation of application No. PCT/CN2021/078282, filed on Feb. 26, 2021.

(30) Foreign Application Priority Data

Feb. 28, 2020 (CN) ......................... 202010131057.0

(51) Int. Cl.

*H01P 1/202* (2006.01)
*H01P 1/20* (2006.01)
(Continued)

(52) U.S. Cl.

CPC ............ *H01P 1/2002* (2013.01); *H01P 1/201* (2013.01); *H01P 1/2056* (2013.01); *H01P 3/16* (2013.01)

(58) Field of Classification Search

CPC ...... H01P 1/2056; H01P 1/2053; H01P 1/208; H01P 1/2002; H01P 1/20; H01P 1/201;
(Continued)

(56) References Cited

U.S. PATENT DOCUMENTS 5,157,365 A 10/1992 Hoang
6,809,612 B2 10/2004 Bloom et al.
(Continued)

FOREIGN PATENT DOCUMENTS

CN 104604022 A 5/2015
CN 106450603 A 2/2017
(Continued)

OTHER PUBLICATIONS

Office Action issued in Chinese Application No. 202010131057.0, dated Oct. 29, 2021, 6 pages (with English translation).
(Continued)

*Primary Examiner* — Stephen E. Jones
(74) *Attorney, Agent, or Firm* — Fish & Richardson P.C.

(57) ABSTRACT

Embodiments of this application disclose a dielectric filter and a communication device. In one example, the dielectric filter includes: a first dielectric block and a second dielectric block that are stacked up, where a first surface of the first dielectric block is opposite to a second surface of the second dielectric block; a first blind hole, a first through hole, and two or more resonance through holes whose openings are located on the first surface of the first dielectric block, and a second through hole whose opening is located on the second surface of the second dielectric block. A metal layer on the first surface of the first dielectric block is connected to a metal layer on the second surface of the second dielectric block.

20 Claims, 11 Drawing Sheets

(51) Int. Cl.
*H01P 1/201* (2006.01)
*H01P 1/205* (2006.01)
*H01P 3/16* (2006.01)

(58) Field of Classification Search
CPC ........ H01P 1/202; H01P 1/205; H01P 1/2088; H01P 1/2133; H01P 3/16; H01P 7/04
See application file for complete search history.

(56) References Cited

U.S. PATENT DOCUMENTS

| | | | |
|---|---|---|---|
| 2002/0180559 | A1 | 12/2002 | Jang |
| 2009/0108962 | A1 | 4/2009 | Fujinaga et al. |

FOREIGN PATENT DOCUMENTS

| | | | |
|---|---|---|---|
| CN | 107534197 | A | 1/2018 |
| CN | 109560355 | A | 4/2019 |
| CN | 109755700 | A | 5/2019 |
| CN | 110265755 | A | 9/2019 |
| CN | 110444849 | A | 11/2019 |
| CN | 110534851 | A | 12/2019 |
| CN | 209843914 | U | 12/2019 |
| CN | 209948008 | U | 1/2020 |
| IN | 206148589 | U | 5/2017 |
| JP | 2001185905 | A | 7/2001 |
| JP | 2003218603 | A | 7/2003 |

OTHER PUBLICATIONS

International Search Report and Written Opinion issued in International Application No. PCT/CN2021/078282, dated May 26, 2021, 17 pages (with English translation).

Extended European Search Report in European Appln No. 21761320.7, dated Jun. 7, 2023, 5 pages.

DIELECTRIC FILTER AND COMMUNICATION DEVICE

CROSS-REFERENCE TO RELATED APPLICATION

This application is a continuation of International Application No. PCT/CN2021/078282, filed on Feb. 26, 2021, which claims priority to Chinese Patent Application No. 202010131057.0, filed on Feb. 28, 2020. The disclosures of the aforementioned applications are hereby incorporated by reference in their entireties.

TECHNICAL FIELD

Embodiments of this application relate to the field of radio communication device technologies, and in particular, to a dielectric filter and a communication device.

BACKGROUND

As radio communication technologies develop, an existing communication system has an increasingly high requirement for a size of a filter. Because a transverse electromagnetic mode (TEM) dielectric filter has advantages such as a small size, a low loss, and low costs, the TEM dielectric filter is widely used in communication systems.

FIG. 1 is a schematic diagram of a structure of a TEM dielectric filter. The TEM dielectric filter includes a dielectric body 01. A plated through hole 02 is disposed in the dielectric body 01, and a plated pattern connected to the through hole 02 is disposed on a surface of the dielectric body 01. As shown in FIG. 2, a capacitive coupling structure 03 used in the TEM dielectric filter implements capacitive coupling between different resonance units through a metal stub on an upper surface of the dielectric body 01.

The TEM dielectric filter using the coupling structure in FIG. 2 has a small power capacity. A spacing between the stub and a metal layer on a surface of a resonator is very small, and therefore, when a power is high, it is easy to break down and strike fire.

In addition, the TEM dielectric filter cannot easily implement cross coupling. Introducing a transmission zero by using cross coupling is a common means of enhancing outband suppression performance in a current filter design. However, because a structural shape of the TEM dielectric filter is limited, a stub type capacitive coupling structure can hardly be applied to a cross-coupling design of a filter.

FIG. 3 is a schematic diagram of a structure of another TEM dielectric filter. FIG. 4 is a schematic diagram of a structure of a coupling structure in FIG. 3. As shown in FIG. 3 and FIG. 4, the TEM dielectric filter includes a dielectric body 01. A housing 04 made of metal is disposed on an outer side of the dielectric body 01. Two plated blind holes 06 are disposed in the dielectric body 01, and the plated blind holes 06 and the surrounding dielectric body 01 form a resonance unit. A coupling hole 05 is disposed between the two plated blind holes 06. The coupling hole 05 is a plated blind hole, and a capacitive gap effect is formed between the coupling hole 05 and the housing 04, so that a resonance through hole frequency can be greatly reduced. As shown in FIG. 4, the depth of the coupling hole 05 is greater than the depth of the blind hole 06 in the resonance unit, and capacitive coupling is implemented through a polarity reversal principle.

However, the TEM dielectric filter with the coupling structure in FIG. 4 can easily introduce a low-end harmonic wave. The coupling structure generates a resonance frequency that is lower than an operating frequency, which leads to deterioration of low-end outband suppression performance of the filter.

In addition, the TEM dielectric filter can hardly implement a weak capacitive coupling. If the TEM dielectric filter needs to implement weak capacitive coupling, the depth of the coupling blind hole needs to be far greater than that of a blind hole of the resonator. In this case, a spacing between the top of the coupling blind hole and a bottom surface of a dielectric is very small, so that processing difficulty is increased and a reliability risk is caused.

Performance of the foregoing TEM dielectric filter is poor. Therefore, it is necessary to ensure radio frequency performance of the filter while a size of the dielectric filter is reduced.

SUMMARY

Embodiments of this application provide a dielectric filter and a communication device, to implement miniaturization of a dielectric filter and improve radio frequency performance of the dielectric filter.

To achieve the foregoing objectives, the following technical solutions are used in embodiments of this application.

According to a first aspect of embodiments of this application, a dielectric filter is provided, including: a first dielectric block and a second dielectric block that are stacked up, where the first dielectric block and the second dielectric block respectively include a first surface and a second surface that are opposite to each other, and the first surface of the first dielectric block is opposite to the second surface of the second dielectric block; a first blind hole, a first through hole, and two or more resonance through holes whose openings are located on the first surface of the first dielectric block; and a second through hole whose opening is located on the second surface of the second dielectric block. Metal layers are disposed on an inner wall of the first blind hole, an inner wall of the first through hole, an inner wall of the second through hole, the first surface of the first dielectric block, and the second surface of the second dielectric block. The metal layer on the first surface of the first dielectric block is opposite to the metal layer on the second surface of the second dielectric block, and the metal layer on the first surface of the first dielectric block is connected to the metal layer on the second surface of the second dielectric block. The metal layer on the inner wall of the first through hole is connected to the metal layer on the first surface of the first dielectric block. The metal layer on the inner wall of the first blind hole is connected to the metal layer on the first surface of the first dielectric block. The metal layer on the inner wall of the second through hole is connected to the metal layer on the second surface of the second dielectric block. Therefore, when the dielectric filter operates, electromagnetic waves in a quasi-TEM mode in the resonance through holes generate an induced current on the first through hole, and the induced current moves from the first blind hole to the second through hole to form a loop. The induced current on a surface of the first blind hole excites generation of an electromagnetic wave in the quasi-TEM mode in a second resonance through hole, thereby implementing capacitive coupling of electromagnetic energy. The dielectric filter has a structure in which dielectric blocks are stacked up, so that the dielectric filter has a smaller size, to facilitate miniaturization of the dielectric filter. In addition, capacitive coupling between the resonance through holes is implemented after a coupling structure is disposed in the dielectric block. Compared with a quasi- TEM mode dielectric filter using a stub in the conventional technology, the dielectric filter using the coupling structure has a small electromagnetic leakage and a greatly improved power capacity, and avoids deterioration of low-end outband suppression performance of the filter.

In an optional implementation, the metal layers are made of silver. Therefore, conductivities of the metal layers are improved, and radio frequency performance of the filter is improved.

In an optional implementation, the metal layers are formed by using a process of electroplating, chemical plating, sputtering, or ion plating. Therefore, the metal layers and the dielectric blocks are connected more stably.

In an optional implementation, the metal layer on the first surface of the first dielectric block includes a first metal layer located around the first blind hole, and a third metal layer located around the resonance through holes. The metal layer on the inner wall of the first through hole and the metal layer on the inner wall of the first blind hole are connected to the first metal layer, and the third metal layer is separated from the first metal layer. Therefore, a metal layer area between the first dielectric block and the second dielectric block is increased by setting the first metal layer and the third metal layer, so that a connection between the first dielectric block and the second dielectric block is more stable. The first metal layer is separated from the third metal layer, so that a short circuit between the resonance through holes or between the resonance through holes and the coupling structure may be avoided.

In an optional implementation, the metal layer on the second surface of the second dielectric block includes a second metal layer located around the second through hole, and a fourth metal layer opposite to the third metal layer. The second metal layer is connected to the first metal layer. In addition, the metal layer on the inner wall of the second through hole is connected to the second metal layer, and the fourth metal layer is separated from the second metal layer. Therefore, the metal layer area between the first dielectric block and the second dielectric block is increased by setting the second metal layer and the fourth metal layer, so that the connection between the first dielectric block and the second dielectric block is more stable, and a capacitive coupling effect is better. The fourth metal layer is separated from the second metal layer, so that the short circuit between the resonance through holes or between the resonance through holes and the coupling structure may be avoided.

In an optional implementation, a resonance unit is formed by each resonance through hole and a surrounding body, and a position in which the first blind hole is located is connected to two resonance units. Therefore, the first blind hole is a coupling hole, and the coupling hole is used for coupling between adjacent resonance units or cross coupling between non-adjacent resonance units. A coupling amount between the resonance through holes may be changed by changing a size and a position of the coupling hole, so that a coupling amount between two adjacent or non-adjacent resonance through holes may be increased without changing the size of the dielectric filter. Therefore, capacitive coupling between the two resonance units may be enhanced.

In an optional implementation, projections of both the first through hole and the second through hole on the first surface of the first dielectric block are located in the first blind hole. Therefore, the coupling amount between the resonance through holes may be changed by changing a distance between the first through hole and the second through hole, so that the coupling amount between two adjacent through holes may be increased without changing the size of the dielectric filter. Therefore, the capacitive coupling between the two resonance units may be enhanced.

In an optional implementation, the first dielectric block and the second dielectric block are made of a ceramic material. Therefore, a size of the resonance unit is inversely proportional to a square root of a relative permittivity of an electromagnetic wave transmission medium. Because a relative permittivity of ceramic is large, when ceramic is used as a transmission medium, the size of the resonance unit may be reduced, to facilitate miniaturization of the dielectric filter.

In an optional implementation, the depth of the first through hole is greater than that of the second through hole. The depth of the first through hole is equal to the thickness of the first dielectric block, and the depth of the second through hole is equal to the thickness of the second dielectric block. A smaller thickness of the second dielectric block indicates a better resonance effect between the resonance through holes. By reducing the thickness of the second dielectric block, the miniaturization of the dielectric filter is facilitated while resonance performance of the dielectric filter is improved.

In an optional implementation, the metal layers are disposed on outer surfaces of the first dielectric block and the second dielectric block. Therefore, the metal layers may effectively shield a signal, to prevent signal energy leakage and external signal interference, thereby improving a capability of suppressing background noise. Therefore, the dielectric filter in this application may prevent signal leakage and implement the miniaturization of the filter.

According to a second aspect of embodiments of this application, a communication device is provided, including the dielectric filter described above. Therefore, the communication device uses the dielectric filter, thereby having a smaller size. This helps to integrate more signal channels and improve spectrum utilization, so that the communication device can transmit a higher-rate data service in a limited radio frequency band.

DESCRIPTION OF EMBODIMENTS

To make the objectives, technical solutions, and advantages of this application clearer, the following further describes this application in detail with reference to the accompanying drawings.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more of the features. In the descriptions of this application, unless otherwise specified, "a plurality of" means two or more.

In addition, in this application, orientation terms such as "above" and "under" are defined relative to orientations of components shown in the accompanying drawings. It should be understood that these orientation terms are relative concepts, are used for description and clarification of the components, and may be correspondingly changed based on changes of the orientations of the components in the accompanying drawings.

Noun Explanations

A transverse electromagnetic mode (TEM) is a waveguide mode in which there are no electric field or magnetic field components in a transmission direction of an electromagnetic wave. The transverse electromagnetic mode is an ideal state. Actually, the transverse electromagnetic mode is usually a quasi-TEM mode. To be specific, electric field and magnetic field components in the transmission direction of the electromagnetic wave are far less than a component in a direction perpendicular to the transmission direction.

A dielectric filter is a filter designed and manufactured by using characteristics such as a low loss, a high permittivity, a small frequency temperature coefficient, a small thermal expansion coefficient, and a tolerable high power of a dielectric (for example, ceramic) material, and may be formed by trapezoidal lines that are formed by several long resonators connected in series or connected in parallel in a longitudinal direction.

An existing dielectric filter performs resonance by processing a blind hole on a dielectric body to form a resonance through hole, is greatly controllable in depth of the blind hole, has large frequency fluctuation, and has a poor consistency. In addition, a negative coupling structure of the existing dielectric filter is difficult implement, because the negative coupling structure is single and is not suitable for large-scale production.

Figure 5:
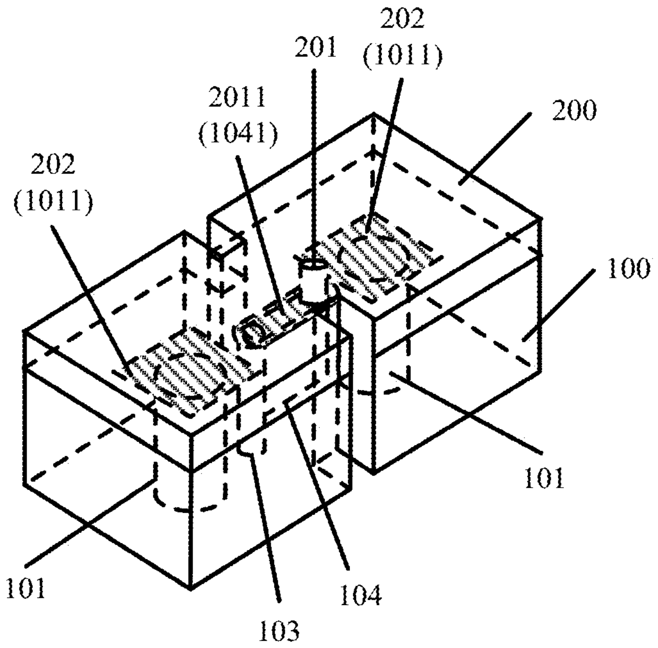
FIG. 5 is a schematic diagram of a structure of a dielectric filter according to an embodiment of this application.
Figure 6:
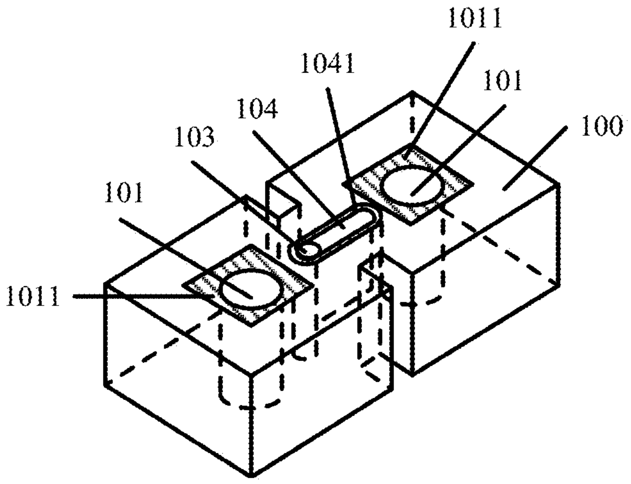
FIG. 6 is a schematic diagram of a structure of a first dielectric block in FIG. 5.
Figure 7:
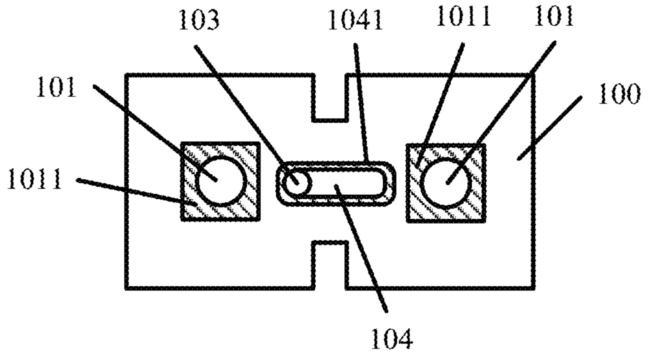
FIG. 7 is a top view of the first dielectric block in FIG. 6.
Figure 8:
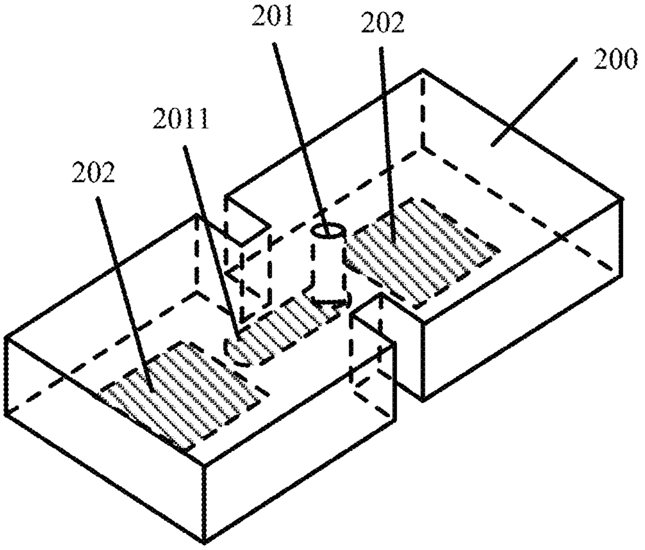
FIG. 8 is a schematic diagram of a structure of a second dielectric block in FIG. 5.
Figure 9:
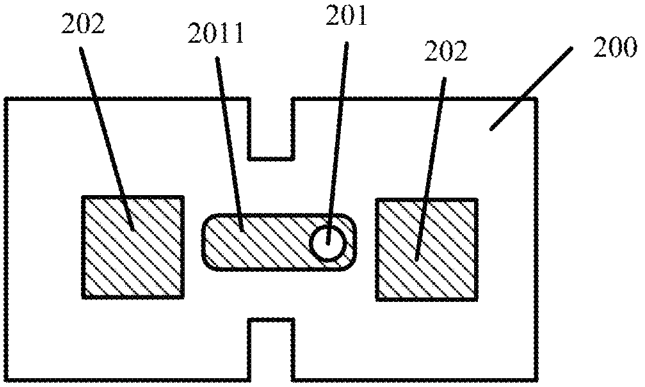
FIG. 9 is a bottom view of the second dielectric block in FIG. 8.
Figure 10:
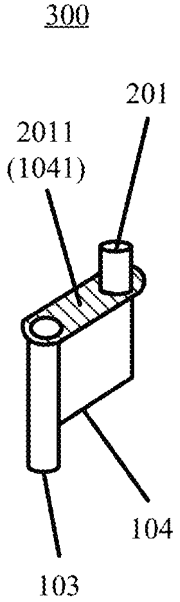
FIG. 10 is a schematic diagram of a structure of a coupling structure in FIG. 5.

FIG. 5 is a schematic diagram of a structure of a dielectric filter according to an embodiment of this application. FIG. 6 is a schematic diagram of a structure of a first dielectric block in FIG. 5. FIG. 7 is a top view of the first dielectric block in FIG. 6. FIG. 8 is a schematic diagram of a structure of a second dielectric block in FIG. 5. FIG. 9 is a bottom view of the second dielectric block in FIG. 8. FIG. 10 is a schematic diagram of a structure of a coupling structure in FIG. 5. As shown in FIG. 5, FIG. 6, FIG. 7, FIG. 8, and FIG. 9, the dielectric filter includes the first dielectric block 100 and the second dielectric block 200 that are stacked up.

The first dielectric block 100 and the second dielectric block 200 respectively include a first surface and a second surface that are opposite to each other, that is, the first surface of the first dielectric block 100 is opposite to the second surface of the second dielectric block 200.

Specific structures of the first dielectric block 100 and the second dielectric block 200 are not limited in this embodiment of this application. For example, both the first dielectric block 100 and the second dielectric block 200 are made of a ceramic material.

Resonance through holes 101 are disposed on the first dielectric block 100, and a quantity of the resonance through holes 101 is two or more than two. In an implementation of this application, for example, there are two resonance through holes 101: a first resonance through hole and a second resonance through hole. A resonance unit is formed by each resonance through hole 101 and a surrounding body. A first resonance unit is formed by the first resonance through hole and the surrounding body, and a second resonance unit is formed by the second resonance through hole and the surrounding bod.

The coupling structure includes a first blind hole 104 and a first through hole 103 that are disposed in the first dielectric block 100, and a second through hole 201 disposed in the second dielectric block.

For example, an opening of the first blind hole 104 and an opening of the first through hole 103 are located on the first surface of the first dielectric block 100.

The second through hole 201 is disposed in the second dielectric block 200, and an opening of the second through hole 201 is located on the second surface of the second dielectric block 200.

Metal layers are disposed on an inner wall of the first blind hole 104, an inner wall of the first through hole 103, an inner wall of the second through hole 201, the first surface of the first dielectric block 100, and the second surface of the second dielectric block 200.

The metal layer on the inner wall of the first through hole 103 and the metal layer on the inner wall of the first blind hole 104 are connected to the metal layer on the first surface of the first dielectric block 100, and the metal layer on the inner wall of the second through hole 201 is connected to the metal layer on the second surface of the second dielectric block 200.

The metal layer on the first surface of the first dielectric block 100 is connected to the metal layer on the second surface of the second dielectric block 200, and after the first dielectric block and the second dielectric block are combined together, a closed capacitive coupling structure with a small electromagnetic leakage and a high power capacity is formed.

When the dielectric filter operates, an electromagnetic wave in a quasi-TEM mode in the first resonance through hole generates an induced current on the first through hole 103, and the induced current moves from the first blind hole 104 to the second through hole 201 to form a loop. The induced current on the surface of the first blind hole 104 excites generation of an electromagnetic wave in the quasi-TEM mode in the second resonance through hole, thereby implementing capacitive coupling of electromagnetic energy.

Figure 1:
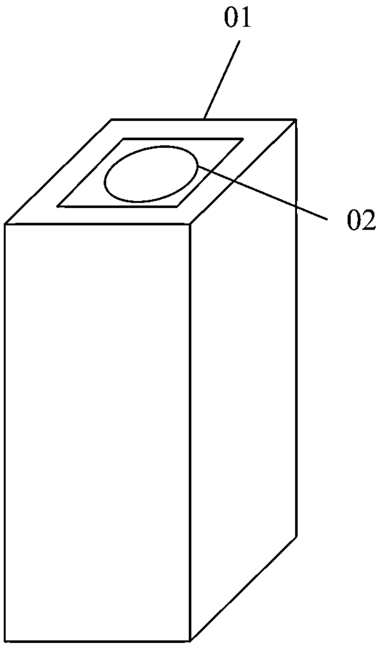
FIG. 1 is a schematic diagram of a structure of a TEM dielectric filter according to the conventional technology.
Figure 2:
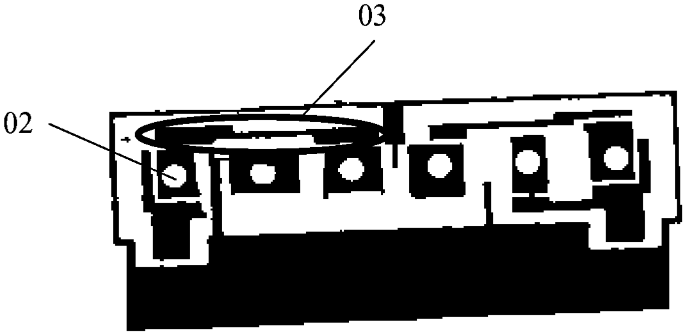
FIG. 2 is a schematic diagram of a structure of a coupling structure in FIG. 1.
Figure 3:
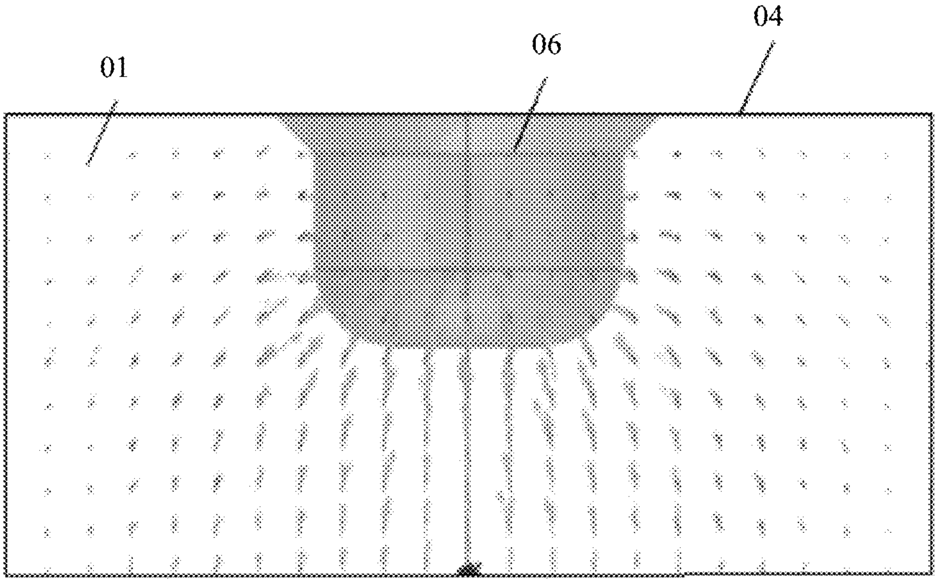
FIG. 3 is a schematic diagram of a structure of another TEM dielectric filter according to the conventional technology.
Figure 4:
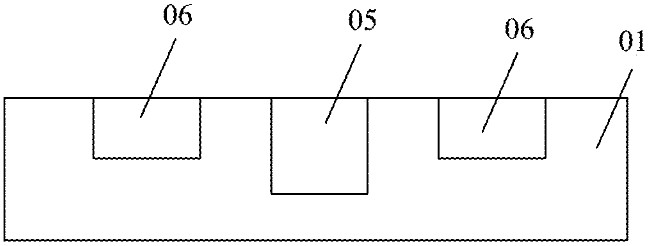
FIG. 4 is a schematic diagram of a structure of a coupling structure in FIG. 3.

The dielectric filter provided in this embodiment of this application has a structure in which the dielectric blocks are stacked up, so that the dielectric filter has a smaller size, to facilitate miniaturization of the dielectric filter. In addition, capacitive coupling between the resonance through holes is implemented after a coupling structure is disposed in the dielectric block. Compared with the quasi-TEM mode dielectric filter using a stub in FIG. 1, the dielectric filter using the coupling structure has a small electromagnetic leakage and a greatly improved power capacity, and avoids deterioration of low-end outband suppression performance of the filter.

A material of the metal layers is not limited in this embodiment of this application. In an implementation of this application, for example, the metal layers of the inner wall of the first blind hole 104, the inner wall of the first through hole 103, the inner wall of the second through hole 201, the first surface of the first dielectric block 100, and the second surface of the second dielectric block 200 are made of silver. The metal layers may be formed on the inner wall of the first blind hole 104, the inner wall of the first through hole 103, the inner wall of the second through hole 201, the first surface of the first dielectric block 100, and the second surface of the second dielectric block 200 by using a process, for example, electroplating, chemical plating, sputtering, or ion plating.

A range of the metal layers on the first surface of the first dielectric block 100 and the second surface of the second dielectric block 200 is not limited in this embodiment of this application. In an implementation of this application, as shown in FIG. 5, the metal layer on the first surface of the first dielectric block 100 includes a first metal layer 1041 disposed around an opening that is of the first blind hole 104 and that is on the first surface of the first dielectric block 100.

The first metal layer 1041 is disposed around the first blind hole 104, and the metal layer on the inner wall of the first blind hole 104 and the metal layer on the inner wall of the first through hole 103 are connected to the first metal layer 1041.

Still with reference to FIG. 5, the metal layer on the second surface of the second dielectric block 200 includes a second metal layer 2011 that is located around the second through hole 201 and that is opposite to the first metal layer 1041.

In an implementation of this application, the second metal layer 2011 is opposite to the first metal layer 1041. In addition, the second metal layer 2011 covers the first blind hole 104 and the first metal layer 1041, and the metal layer on the inner wall of the second through hole 201 is connected to the second metal layer 2011.

In addition, still with reference to FIG. 5, the metal layer on the first surface of the first dielectric block 100 further includes a third metal layer 1011 disposed around openings that are of the resonance through holes 101 and that are on the first surface of the first dielectric layer, and the third metal layer 1011 is separated from the first metal layer 1041.

The third metal layer 1011 is disposed around the openings that are of the resonance through holes 101 and that are on the first surface of the first dielectric block 100. Inner walls of the resonance through holes 101 are covered with the metal layers, and the metal layers of the inner walls of the resonance through holes 101 are connected to the third metal layer 1011.

A position in which the first blind hole 104 is located is connected to the two resonance units, and the third metal layer 1011 is separated from the first metal layer 1041, so that a short circuit between the resonance through holes 101 or between the resonance through holes 101 and the coupling structure 300 is avoided.

The metal layer on the second surface of the second dielectric block 200 further includes a fourth metal layer 202. The fourth metal layer 202 is opposite to the third metal layer 1011, and a shape and a size of the fourth metal layer 202 are the same as those of the third metal layer 1011. The third metal layer 1011 is connected to the fourth metal layer 202.

A position in which the first blind hole 104 is located is connected to the two resonance units, and the fourth metal layer 202 is separated from the second metal layer 2011, so that the short circuit between the resonance through holes 101 or between the resonance through holes 101 and the coupling structure 300 is avoided.

Shapes of the first blind hole 104, the first through hole 103, and the second through hole 201 are not limited in this embodiment of this application. As shown in FIG. 5 and FIG. 10, the first blind hole 104, the first through hole 103, and the second through hole 201 in the coupling structure 300 may be parallel to the resonance through holes 101, thereby facilitating coupling between the coupling structure 300 and the resonance through holes 101. In addition, the first blind hole 104, the first through hole 103, and the second through hole 201 may have a plurality of shapes of cross section. For example, the first blind hole 104, the first through hole 103, and the second through hole 201 may be circular holes, flat holes, or elliptical holes. The shapes and sizes of the first blind hole 104, the first through hole 103, and the second through hole 201 may be set according to an actual requirement.

In an implementation of this application, as shown in FIG. 5, projections of the first through hole 103 and the second through hole 201 on the first surface of the first dielectric block 100 are located in the first blind hole 104, and are tangent to an inner side of the first blind hole 104. Therefore, the metal layer on the inner wall of the first blind hole 104 and the metal layer on the inner wall of the first through hole 103 may be connected to the first metal layer 1041 that is around the first blind hole 104, and the metal layer on the inner wall of the second through hole 201 may be connected to the second metal layer 2011.

Still with reference to FIG. 5, the first through hole 103 is located in the first blind hole 104, and an opening of the second through hole 201 on the second surface of the second dielectric block overlaps the opening of the first blind hole 104. As shown in FIG. 5, the opening that is of the first blind hole 104 and that is on the first surface of the first dielectric block has a strip structure. The first through hole 103 and the second through hole 201 are disposed in a length direction of the first blind hole 104, and the projections of the first through hole 103 and the second through hole 201 on the first surface of the first dielectric block are respectively located at two ends of the first blind hole 104. Diameters of the first through hole 103 and the second through hole 201 are equal to a width of the first blind hole 104, and a length of the first blind hole 104 is greater than or equal to a sum of the diameters of the first through hole 103 and the second through hole 201.

In this embodiment of this application, different the coupling amounts may be implemented by changing a spacing between the first through hole 103 and the second through hole and the depth of the first blind hole 104. For example, a larger spacing between the first through hole 103 and the second through hole 201 leads to a larger coupling amount, and a deeper depth of the first blind hole 104 leads to a larger coupling amount. The spacing between the first through hole 103 and the second through hole and the depth of the first blind hole 104 may be set based on an actual required coupling amount. Therefore, the first blind hole is a coupling hole, and the coupling hole is used for coupling between adjacent resonance units or cross coupling between non-adjacent resonance units. The coupling amount between the resonance through holes may be changed by changing a size and a position of the coupling hole, so that the coupling amount between two adjacent or non-adjacent resonance through holes may be increased without changing the size of the dielectric filter, and the capacitive coupling between the two resonance units may be enhanced. In addition, the coupling amount between the resonance through holes may be changed by changing a distance between the first through hole and the second through hole, so that the coupling amount between the two adjacent resonance through holes may be increased without changing the size of the dielectric filter, and the capacitive coupling between the two resonance units may be enhanced.

The thickness of the first dielectric block 100 is greater than that of the second dielectric block 200. When the thickness of the second dielectric block 200 is reduced, resonance performance between the resonance through holes 101 may be improved, and sizes of the resonance through holes 101 may be correspondingly reduced, to facilitate the miniaturization of the dielectric filter.

In another implementation of this application, the metal layers are disposed on outer surfaces of the first dielectric block 100 and the second dielectric block 200. Therefore, the metal layers may effectively shield a signal, to prevent signal energy leakage and external signal interference, thereby improving a capability of suppressing background noise. Therefore, the dielectric filter in this application may prevent signal leakage and implement the miniaturization of the filter.

Figure 11:
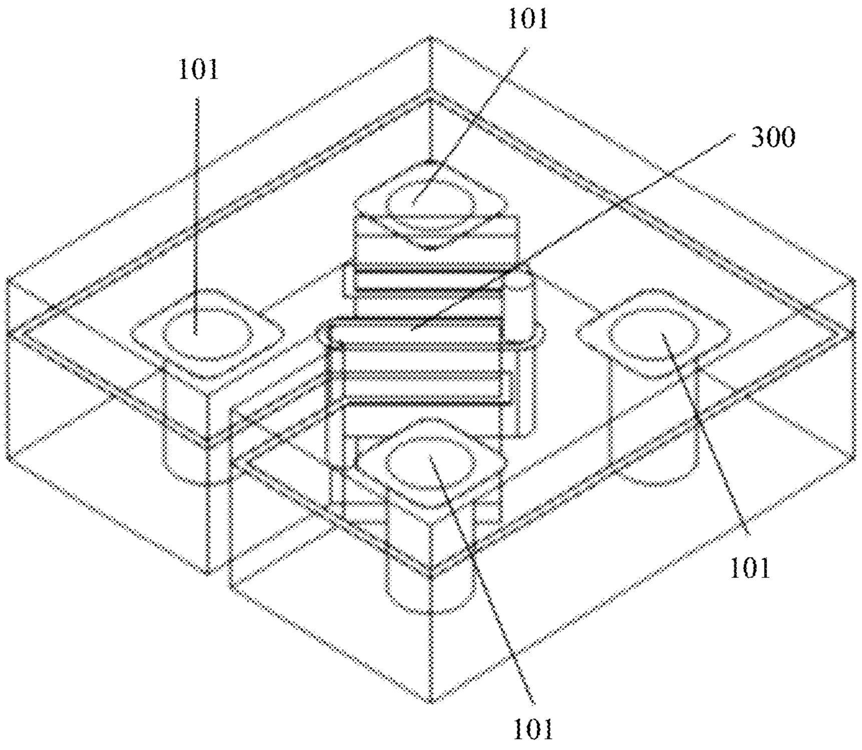
FIG. 11 is a schematic diagram of a structure of another dielectric filter.
Figure 12:
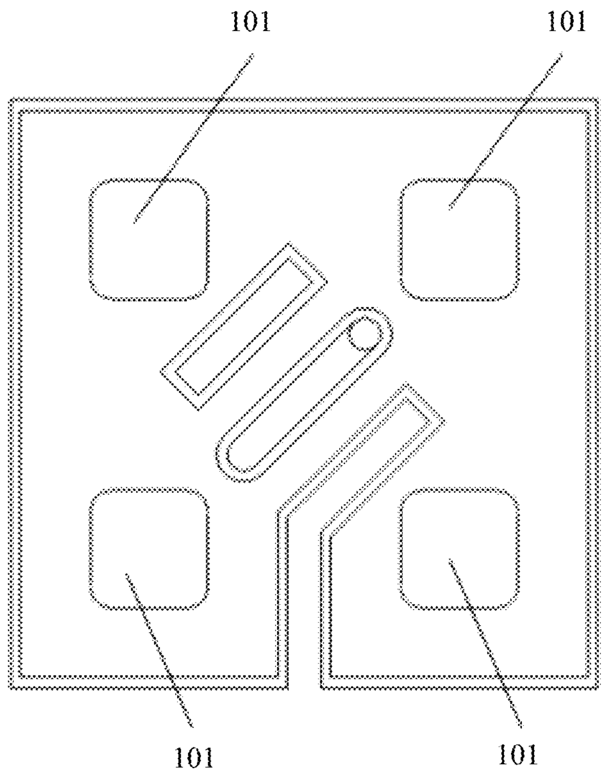
FIG. 12 is a top view of the dielectric filter in FIG. 11.

The foregoing coupling structure 300 may be used in a cross coupling structure. In an implementation of this application, as shown in FIG. 11 and FIG. 12, the coupling structure 300 may be disposed in a cascaded triplet (CT) type cross coupling structure.

Figure 13:
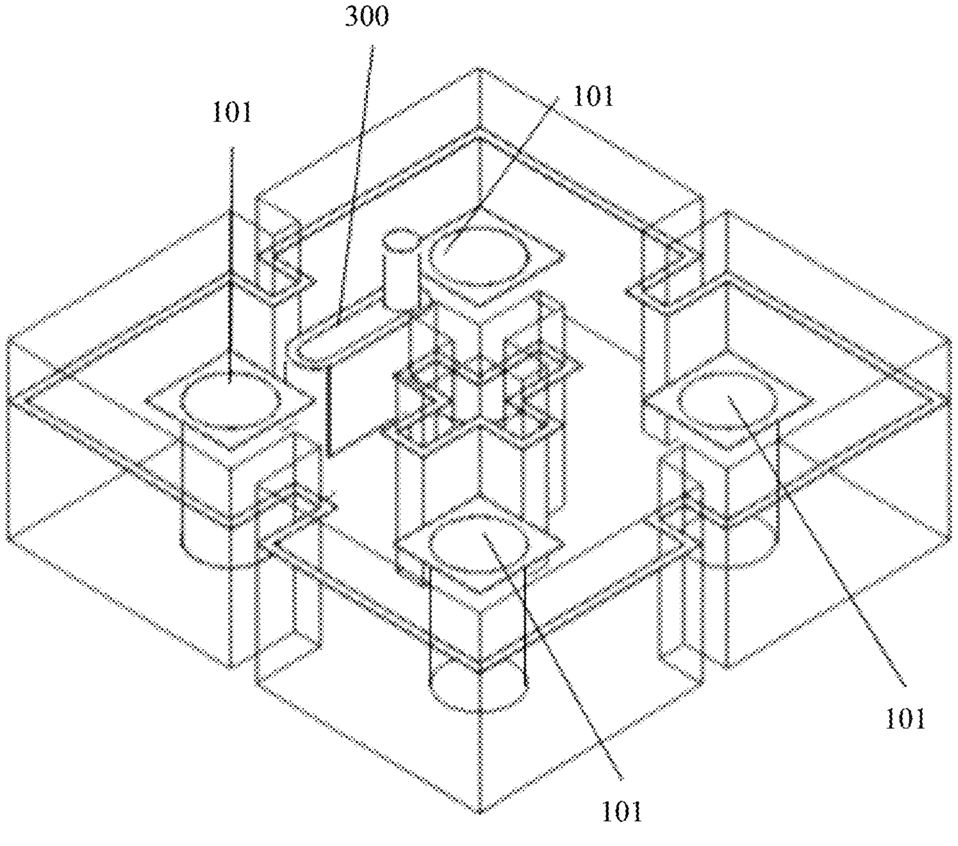
FIG. 13 is a schematic diagram of a structure of another dielectric filter.
Figure 14:
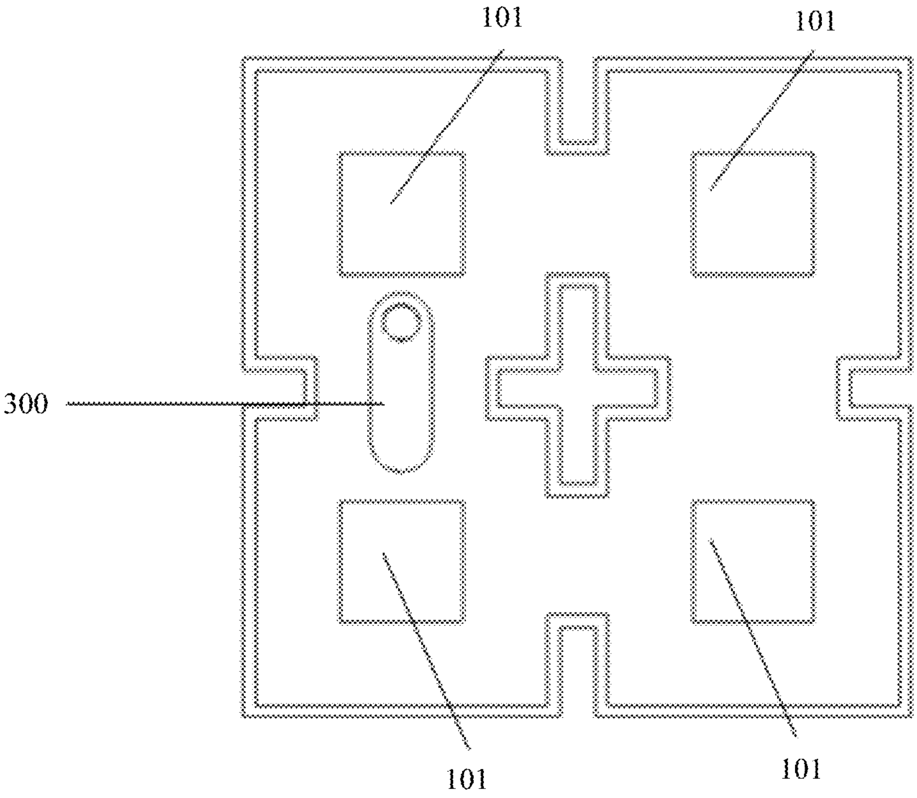
FIG. 14 is a top view of the dielectric filter in FIG. 13.

In another implementation of this application, as shown in FIG. 13 and FIG. 14, the coupling structure 300 may be disposed in a cascaded quadruplet (CQ) type cross coupling structure or a BOX type cross coupling structure.

Figure 15:
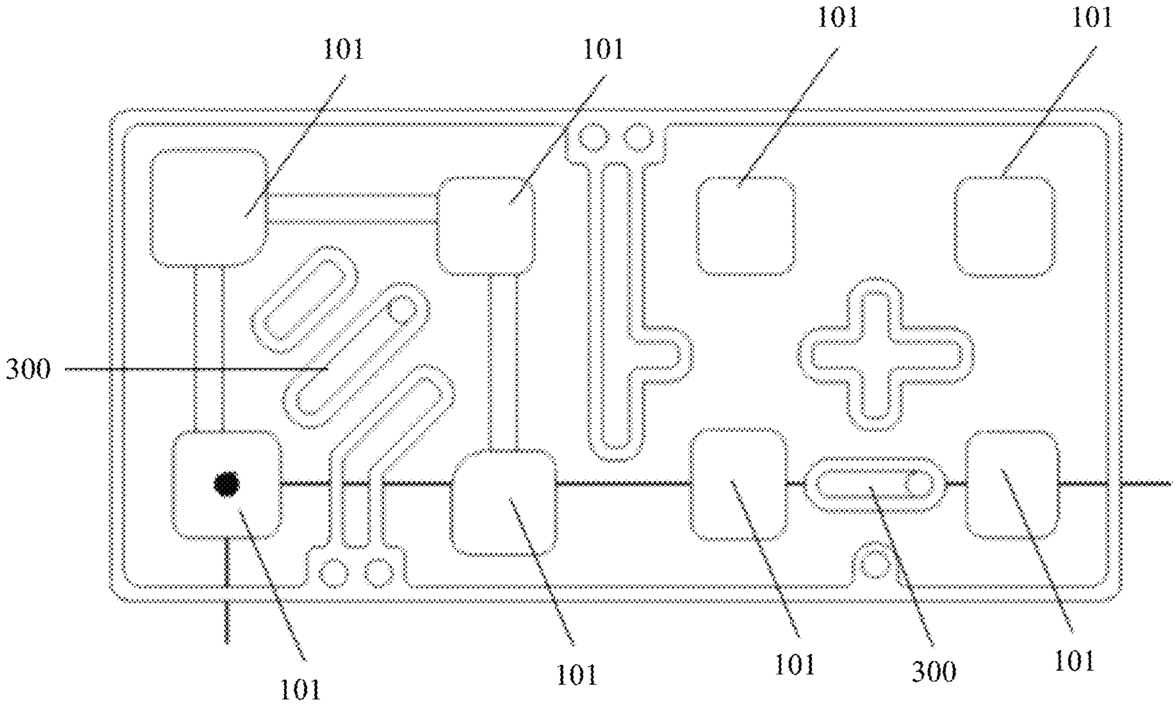
FIG. 15 is a top view of another dielectric filter.

In another implementation of this application, as shown in FIG. 15, the coupling structure 300 may alternatively be used in a cross coupling structure of a combination of a CT type and a Box type.

The dielectric filter shown in FIG. 15 includes eight resonance through holes. Four resonance through holes on the left are arranged in the CT type, and four resonance through holes on the right are arranged in the Box type. One coupling structure 300 is disposed between a lower left corner and an upper right corner of the resonance through holes arranged in the CT type, and one coupling structure 300 is disposed between a lower left corner and a lower right corner of the resonance through holes arranged in the BOX type. The coupling structure 300 may be configured to adjust a coupling amount and a resonance frequency.

An outband suppression experiment is performed on the dielectric filter shown in FIG. 15. The following describes a filtering effect of the dielectric filter in this embodiment of this application with reference to experimental data.

Figure 16:
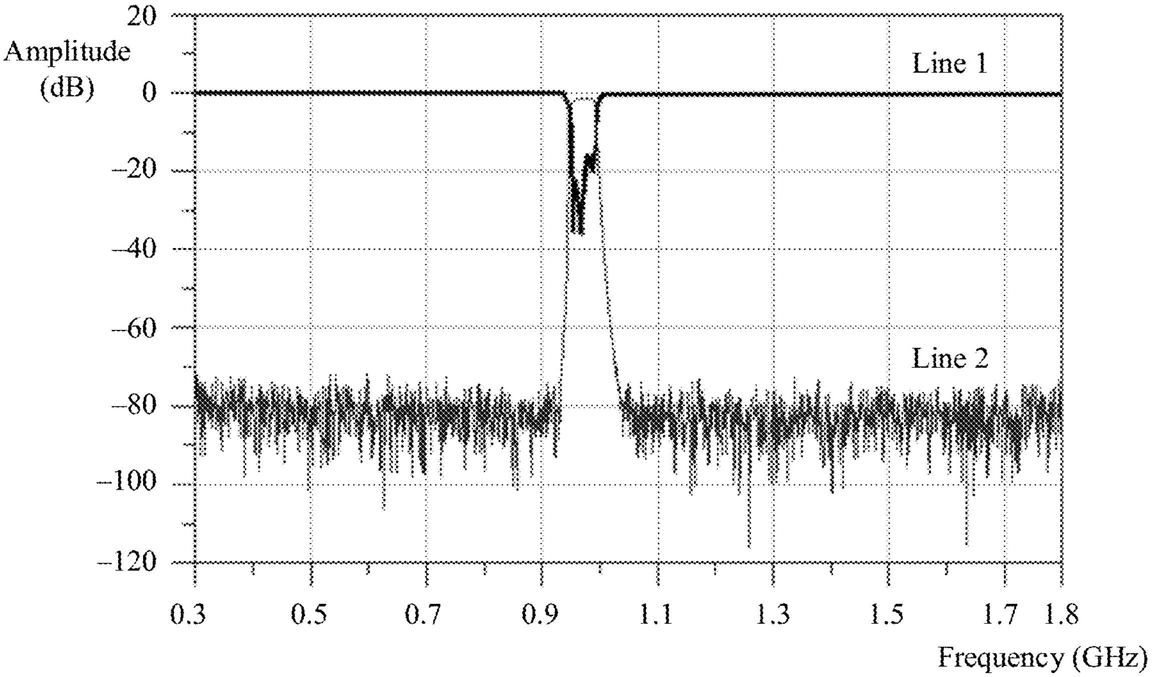
FIG. 16 is a simulation curve graph of a dielectric filter according to an embodiment of this application.
Figure 17:
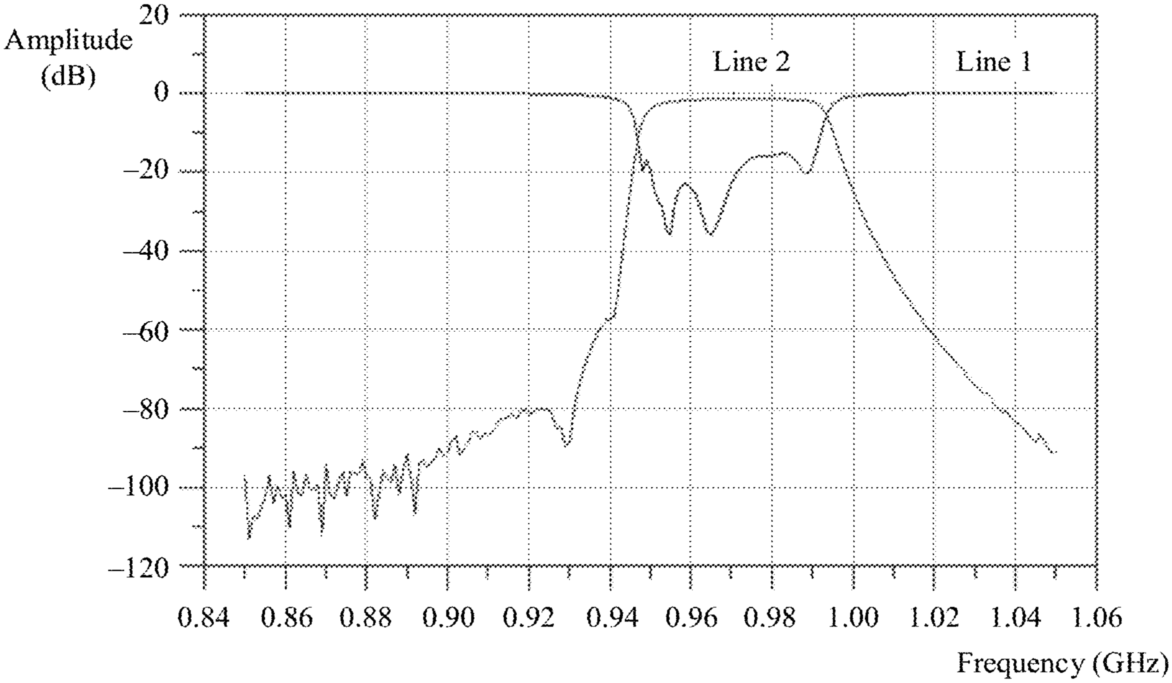
FIG. 17 is a locally enlarged diagram of the simulation curve graph in FIG. 16.

As shown in FIG. 16 and FIG. 17, the coupling structure 300 used in the cross coupling structure of the combination of the CT type and the Box type may implement two transmission zeros. A line 1 is a curve graph in which a reflection factor changes with a frequency, and a line 2 is a curve graph in which an insertion loss changes with the frequency. The dielectric filter provided in this embodiment of this application introduces two low-end transmission zeros by using cross coupling, thereby effectively enhancing a capability of the dielectric filter to suppress an out-of-band signal.

Therefore, the coupling structure 300 can implement both strong coupling and weak coupling, and is applicable to common cross coupling structures such as a CT type cross coupling structure and a CQ type cross coupling structure.

In addition, this application further provides a communication device. The communication device includes the dielectric filter disclosed in embodiments of the present invention.

The communication device provided in this embodiment of this application uses the dielectric filter disclosed in embodiments of the present invention, so that the miniaturization of the filter can be implemented, and an overall size of the communication device may be smaller.

It should be noted that the communication device provided in this embodiment of this application may be a transceiver, a base station, a microwave communication device, a Wi-Fi communication device, or the like, or may be terminal devices of various types.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A dielectric filter, comprising:

a first dielectric block and a second dielectric block that are stacked up, wherein the first dielectric block and the second dielectric block respectively comprise a first surface and a second surface that are opposite to each other, and the first surface of the first dielectric block is opposite to the second surface of the second dielectric block;

a first blind hole, a first through hole, and two or more resonance through holes whose openings are located on the first surface of the first dielectric block; and a second through hole whose opening is located on the second surface of the second dielectric block, wherein metal layers are disposed on an inner wall of the first blind hole, an inner wall of the first through hole, an inner wall of the resonance through holes, an inner wall of the second through hole, the first surface of the first dielectric block, and the second surface of the second dielectric block; and the metal layer on the first surface of the first dielectric block is opposite to the metal layer on the second surface of the second dielectric block, the metal layer on the first surface of the first dielectric block is connected to the metal layer on the second surface of the second dielectric block, the metal layer on the inner wall of the first through hole is connected to the metal layer on the first surface of the first dielectric block, the metal layer on the inner wall of the first blind hole is connected to the metal layer on the first surface of the first dielectric block, and the metal layer on the inner wall of the second through hole is connected to the metal layer on the second surface of the second dielectric block.

2. The dielectric filter according to claim 1, wherein the metal layers are made of silver.

3. The dielectric filter according to claim 1, wherein the metal layers are formed by using a process of electroplating, chemical plating, sputtering, or ion plating.

4. The dielectric filter according to claim 1, wherein the metal layer on the first surface of the first dielectric block comprises a first metal layer located around the first blind hole, and a third metal layer located around the resonance through holes, the metal layer on the inner wall of the first through hole and the metal layer on the inner wall of the first blind hole are connected to the first metal layer, the metal layer on the inner wall of the resonance through holes is connected to the third metal layer, and the third metal layer is separated from the first metal layer.

5. The dielectric filter according to claim 4, wherein the metal layer on the second surface of the second dielectric block comprises a second metal layer located around the second through hole, and a fourth metal layer opposite to the third metal layer, the second metal layer is connected to the first metal layer, the metal layer on the inner wall of the second through hole is connected to the second metal layer, and the fourth metal layer is separated from the second metal layer.

6. The dielectric filter according to claim 1, wherein projections of both the first through hole and the second through hole on the first surface of the first dielectric block are located in the first blind hole.

7. The dielectric filter according to claim 1, wherein a resonance unit is formed by each resonance through hole and a surrounding body, and a position in which the first blind hole is located is connected to two resonance units.

8. The dielectric filter according to claim 1, wherein the first dielectric block and the second dielectric block are made of a ceramic material.

9. The dielectric filter according to claim 1, wherein a depth of the first through hole is greater than a depth of the second through hole.

10. The dielectric filter according to claim 1 wherein the metal layers are disposed on outer surfaces of the first dielectric block and the second dielectric block.

11. A communication device, comprising a dielectric filter, wherein the dielectric filter comprises:

a first dielectric block and a second dielectric block that are stacked up, wherein the first dielectric block and the second dielectric block respectively comprise a first surface and a second surface that are opposite to each other, and the first surface of the first dielectric block is opposite to the second surface of the second dielectric block;

a first blind hole, a first through hole, and two or more resonance through holes whose openings are located on the first surface of the first dielectric block; and a second through hole whose opening is located on the second surface of the second dielectric block, wherein metal layers are disposed on an inner wall of the first blind hole, an inner wall of the first through hole, an inner wall of the resonance through holes, an inner wall of the second through hole, the first surface of the first dielectric block, and the second surface of the second dielectric block; and the metal layer on the first surface of the first dielectric block is opposite to the metal layer on the second surface of the second dielectric block, the metal layer on the first surface of the first dielectric block is connected to the metal layer on the second surface of the second dielectric block, the metal layer on the inner wall of the first through hole is connected to the metal layer on the first surface of the first dielectric block, the metal layer on the inner wall of the first blind hole is connected to the metal layer on the first surface of the first dielectric block, and the metal layer on the inner wall of the second through hole is connected to the metal layer on the second surface of the second dielectric block.

12. The communication device according to claim 11, wherein the metal layers are made of silver.

13. The communication device according to claim 11, wherein the metal layers are formed by using a process of electroplating, chemical plating, sputtering, or ion plating.

14. The communication device according to claim 11, wherein the metal layer on the first surface of the first dielectric block comprises a first metal layer located around the first blind hole, and a third metal layer located around the resonance through holes, the metal layer on the inner wall of the first through hole and the metal layer on the inner wall of the first blind hole are connected to the first metal layer, the metal layer on the inner wall of the resonance through holes is connected to the third metal layer, and the third metal layer is separated from the first metal layer.

15. The communication device according to claim 14, wherein the metal layer on the second surface of the second dielectric block comprises a second metal layer located around the second through hole, and a fourth metal layer opposite to the third metal layer, the second metal layer is connected to the first metal layer, the metal layer on the inner wall of the second through hole is connected to the second metal layer, and the fourth metal layer is separated from the second metal layer.

16. The communication device according to claim 11, wherein projections of both the first through hole and the second through hole on the first surface of the first dielectric block are located in the first blind hole.

17. The communication device according to claim 11, wherein a resonance unit is formed by each resonance through hole and a surrounding body, and a position in which the first blind hole is located is connected to two resonance units.

18. The communication device according to claim 11, wherein the first dielectric block and the second dielectric block are made of a ceramic material.

19. The communication device according to claim 11, wherein a depth of the first through hole is greater than a depth of the second through hole.

20. The communication device according to claim 11 wherein the metal layers are disposed on outer surfaces of the first dielectric block and the second dielectric block.

* * * * *